US009026591B2

(12) United States Patent
Edamadaka et al.

(10) Patent No.: US 9,026,591 B2
(45) Date of Patent: May 5, 2015

(54) SYSTEM AND METHOD FOR ADVANCED COMMUNICATION THREAD ANALYSIS (75) Inventors: Rajeshwari Edamadaka, Allentown, NJ (US); Venkatesh Krishnaswamy, Holmdel, NJ (US); Xiaotao Wu, Edison, NJ (US)

(73) Assignee: Avaya Inc., Basking Ridge, NJ (US)

( * ) Notice: Subject to any disclaimer, the term of this patent is extended or adjusted under 35 U.S.C. 154(b) by 332 days.

(21) Appl. No.: 13/115,704

(22) Filed: May 25, 2011

(65) Prior Publication Data

US 2012/0221638 A1 Aug. 30, 2012

Related U.S. Application Data (60) Provisional application No. 61/447,350, filed on Feb. 28, 2011.

(51) Int. Cl.
*G06Q 10/10* (2012.01)
*H04L 12/58* (2006.01)
*G06Q 50/00* (2012.01)
*G06F 17/30* (2006.01)

(52) U.S. Cl.
CPC .............. *H04L 51/16* (2013.01); *G06Q 10/107* (2013.01); *G06Q 50/01* (2013.01); *H04L 51/36* (2013.01)

(58) Field of Classification Search
CPC ...... G06Q 10/10; G06Q 10/107; H04L 51/16; H04L 51/36; H04L 12/586; H04L 12/589
USPC ............ 709/204, 206, 207, 217, 224; 706/45, 706/55; 707/722, 723, 737–739, 748–755; 715/736–739; 455/412.1–419
See application file for complete search history.

(56) References Cited

U.S. PATENT DOCUMENTS

| | | |
|---|---|---|
| 5,864,855 A | 1/1999 | Ruocco et al. |
| 5,974,396 A | 10/1999 | Anderson et al. |
| 5,983,224 A | 11/1999 | Singh et al. |
| 6,012,058 A | 1/2000 | Fayyad et al. |
| 6,038,574 A | 3/2000 | Pitkow et al. |
| 6,263,337 B1 | 7/2001 | Fayyad et al. |
| 6,374,251 B1 | 4/2002 | Fayyad et al. |
| 6,490,582 B1 | 12/2002 | Fayyad et al. |
| 6,556,958 B1 | 4/2003 | Chickering |
| 6,564,197 B2 | 5/2003 | Sahami et al. |
| 6,567,936 B1 | 5/2003 | Yang et al. |
| 6,581,058 B1 | 6/2003 | Fayyad et al. |

(Continued)

*Primary Examiner* — Un C Cho
*Assistant Examiner* — Peian Lou (57) ABSTRACT

Disclosed herein are systems, methods, and non-transitory computer-readable storage media for forming communication threads. A system configured to practice the method receives a first log of first communications in a first modality and receives a second log of second communications in a second modality. Then, the system analyzes the first log and the second log to determine relationships between the first communications and the second communications. The system identifies, based on the relationships, sets of communications having a relationship strength above a threshold, and can form communication threads based on the sets of communications. The system can form communication threads by adding a meta-data tag to a communication unit. Example modalities include short message service (SMS), text, instant messages, phone calls, video calls, emails, events, social networking, and voicemail. The system can further rank the importance of communications threads based on user actions, to yield an importance value.

20 Claims, 5 Drawing Sheets

(56) References Cited

U.S. PATENT DOCUMENTS

| | | |
|---|---|---|
| 6,598,054 B2 | 7/2003 | Schuetze et al. |
| 6,728,932 B1 | 4/2004 | Chundi et al. |
| 6,745,184 B1 | 6/2004 | Choi et al. |
| 6,882,998 B1 | 4/2005 | Stemp |
| 6,925,460 B2 | 8/2005 | Kummamuru et al. |
| 6,928,434 B1 | 8/2005 | Choi et al. |
| 6,931,350 B2 | 8/2005 | Zhang |
| 6,934,911 B2 | 8/2005 | Salmimaa et al. |
| 7,062,536 B2 | 6/2006 | Fellenstein et al. |
| 7,130,839 B2 | 10/2006 | Boreham et al. |
| 7,280,986 B2 | 10/2007 | Goldberg et al. |
| 7,313,574 B2 | 12/2007 | Paalasmaa et al. |
| 7,333,985 B2 | 2/2008 | Weare |
| 7,441,186 B2 | 10/2008 | Kasperkiewicz et al. |
| 7,454,716 B2 | 11/2008 | Venolia |
| 7,464,110 B2 | 12/2008 | Pyhälammi et al. |
| 7,469,246 B1 | 12/2008 | Lamping |
| 7,478,103 B2 | 1/2009 | Warner et al. |
| 7,523,109 B2 | 4/2009 | Weare |
| 7,584,100 B2 | 9/2009 | Zhang et al. |
| 7,617,176 B2 | 11/2009 | Zeng et al. |
| 7,624,102 B2 | 11/2009 | Watson |
| 7,653,660 B2 | 1/2010 | Frieden et al. |
| 7,685,201 B2 | 3/2010 | Zeng et al. |
| 7,689,585 B2 | 3/2010 | Zeng et al. |
| 7,702,315 B2 | 4/2010 | Engstrom et al. |
| 7,707,148 B1 | 4/2010 | Fogel |
| 7,707,171 B2 | 4/2010 | Willcock |
| 7,765,212 B2 | 7/2010 | Surendran et al. |
| 7,769,144 B2 | 8/2010 | Yao et al. |
| 7,805,446 B2 | 9/2010 | Potok et al. |
| 7,809,718 B2 | 10/2010 | Brinker et al. |
| 7,844,566 B2 | 11/2010 | Wnek |
| 7,852,414 B2 | 12/2010 | Kijak et al. |
| 7,890,871 B2 * | 2/2011 | Etkin ............................ 715/738 |
| 8,332,475 B2 * | 12/2012 | Rosen et al. .................. 709/206 |
| 2003/0158855 A1 * | 8/2003 | Farnham et al. ............... 707/102 |
| 2010/0169480 A1 * | 7/2010 | Pamidiparthi ................. 709/224 |

* cited by examiner

SYSTEM AND METHOD FOR ADVANCED COMMUNICATION THREAD ANALYSIS

RELATED APPLICATIONS

This application claims priority to U.S. Provisional Application 61/447,350, filed 28 Feb. 2011, the contents of which are herein incorporated by reference in their entirety.

BACKGROUND

1. Technical Field

The present disclosure relates to grouping communications and more specifically to creating threads from communications of varying modalities.

2. Introduction

When receiving large amounts of texts, emails, and other forms of communication, organizing the information in a meaningful way becomes difficult. A simple solution is to organize folders, or directories, of communications from a particular individual or regarding a particular topic. This solution, however, becomes ineffective when applied to communications from a variety of different modalities.

The wide variety of modalities used in modern communications further complicate this problem. A non-exhaustive list of communication modalities includes email, Twitter, texting or Short Message Service (SMS) communications, voicemail, events or event planning, video chat, instant messaging, phone conversations, social media based messages, and others. Often users shift from one modality to another in a single conversation, or users switch modalities multiple times within the conversation. In another situation, a single conversation may run in parallel through differing modalities.

In single modalities, the technology of threading has emerged, where a computing device processes the communications and organizes them according to a common theme or a common line of discussion. These organized units are termed threads, and a user can then access the thread to view all the related communications. However, these threads are limited to a single communication modality. Software can organize communications of a single modality into threads, but in a situation with different modalities the user has no option but to manually organize or search through multiple messages and modalities. This is a lengthy and time-consuming process. An improved means for organizing communications of different modalities is needed.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Disclosed are systems, methods, and non-transitory computer-readable storage media for analyzing communications of varying modalities and creation of communication threads based on similar communications. A system that forms threads of multi-modal communications can compare data between those communications. The threads can mimic threads derived from replies and forwards in a single modality system such as an email client. Based on available data, the system can form threads of phone calls in a similar manner. The system can first generate communication threads in each of a group of modalities, then merge the threads across modalities.

After developing single modality threads, the system searches for similar subject matter, themes, or documents in threads of differing modalities. The system also analyzes the temporal relationships of communications. For example, the system can search for communications that were triggered by another communication, that ran in parallel to another communication, or that immediately followed another communication. The system can track user activity and record that data in a database, or can rely on previously gathered information or metadata describing the communications. The system can use this information to organize and merge threads.

Upon forming threads of communications having various modalities, the system can optionally determine how the threads relate to an individual user. The contributions and participation of the individual to a thread help the system to calculate the participation value of a person to that thread. The participation value, along with user activity, data access, temporal relationships, and other such factors can help to define how important a thread is to an individual. In displaying thread information as recommendations, the system can show those items of more importance to the user, and can refrain from recommending items determined to have little value or make less prominent recommendations.

Having created threads and determined the importance a thread has to an individual, the system can then group threads into projects, and people into teams based on those threads. This process is similar to that of determining the importance value of a thread to an individual, only now the importance of other people with respect to an individual is being considered. Upon determining the individuals which matter most, they can be added to a team and verify that they use the common threads of other team members. Similarly, the system can combine or split teams as required. The system can group threads into projects in a similar manner. Based on topic analysis functions, the system can determine thread proximity, and group closely related threads together. When more than one set of threads overlap, the system can combine two or more sets together, depending on the proximity of the threads.

With time, the amount of communications, threads, teams, projects, and user data can increase to include a significant amount of information. If the system treats all this information with equal weight, the system may assign older threads a higher importantance than recently created or modified threads. Thus, the system can implement a decay function as part of the valuing system. Over time, according to the decay function, the system can rank older threads with a lower importance as compared to newer threads.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

The present disclosure addresses the need in the art for combining related communications of different modalities. A system, method and non-transitory computer-readable media are disclosed which analyze communications having different modalities, group them into threads, rank the relative importance of those threads to a user, and group users and threads into teams and projects. The system, method and non-transitory computer-readable media then determine what relates best to the user in the current contextual situation of the user and display those items having the highest ranking to the user. A brief introductory description of a basic general purpose system or computing device in FIG. 1 which can be employed to practice the concepts is disclosed herein. A more detailed description of creating threads and subsequent analysis and usage will then follow with exemplary variations. These variations shall be discussed herein as the various embodiments are set forth. The disclosure now turns to FIG. 1.

Figure 1:
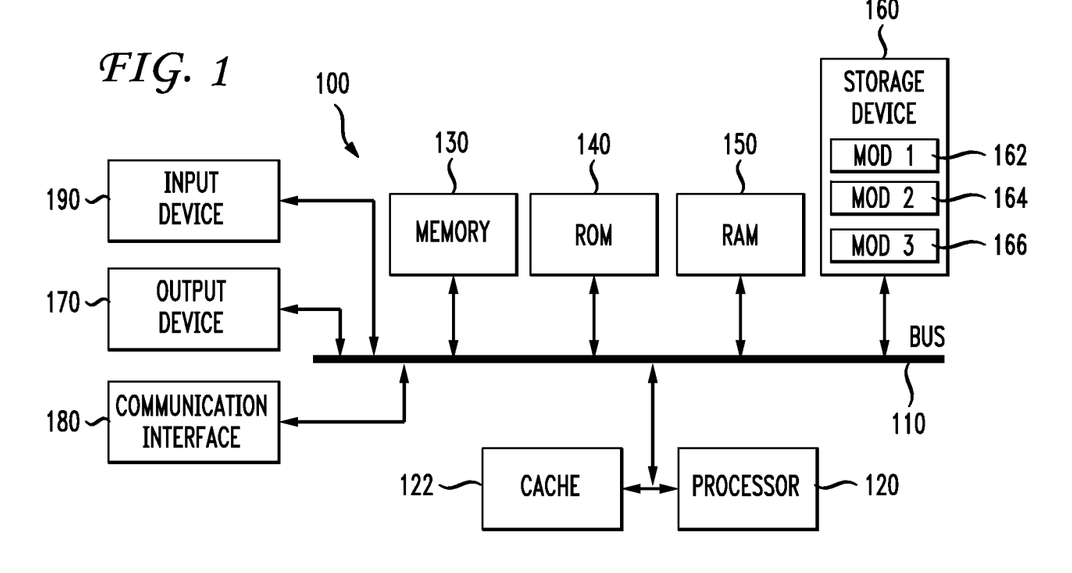
FIG. 1 illustrates an example system embodiment.

With reference to FIG. 1, an exemplary system 100 includes a general-purpose computing device 100, including a processing unit (CPU or processor) 120 and a system bus 110 that couples various system components including the system memory 130 such as read only memory (ROM) 140 and random access memory (RAM) 150 to the processor 120. The system 100 can include a cache 122 of high speed memory connected directly with, in close proximity to, or integrated as part of the processor 120. The system 100 copies data from the memory 130 and/or the storage device 160 to the cache 122 for quick access by the processor 120. In this way, the cache provides a performance boost that avoids processor 120 delays while waiting for data. These and other modules can control or be configured to control the processor 120 to perform various actions. Other system memory 130 may be available for use as well. The memory 130 can include multiple different types of memory with different performance characteristics. It can be appreciated that the disclosure may operate on a computing device 100 with more than one processor 120 or on a group or cluster of computing devices networked together to provide greater processing capability. The processor 120 can include any general purpose processor and a hardware module or software module, such as module 1 162, module 2 164, and module 3 166 stored in storage device 160, configured to control the processor 120 as well as a special-purpose processor where software instructions are incorporated into the actual processor design. The processor 120 may essentially be a completely self-contained computing system, containing multiple cores or processors, a bus, memory controller, cache, etc. A multi-core processor may be symmetric or asymmetric.

The system bus 110 may be any of several types of bus structures including a memory bus or memory controller, a peripheral bus, and a local bus using any of a variety of bus architectures. A basic input/output (BIOS) stored in ROM 140 or the like, may provide the basic routine that helps to transfer information between elements within the computing device 100, such as during start-up. The computing device 100 further includes storage devices 160 such as a hard disk drive, a magnetic disk drive, an optical disk drive, tape drive or the like. The storage device 160 can include software modules 162, 164, 166 for controlling the processor 120. Other hardware or software modules are contemplated. The storage device 160 is connected to the system bus 110 by a drive interface. The drives and the associated computer readable storage media provide nonvolatile storage of computer readable instructions, data structures, program modules and other data for the computing device 100. In one aspect, a hardware module that performs a particular function includes the software component stored in a non-transitory computer-readable medium in connection with the necessary hardware components, such as the processor 120, bus 110, display 170, and so forth, to carry out the function. The basic components are known to those of skill in the art and appropriate variations are contemplated depending on the type of device, such as whether the device 100 is a small, handheld computing device, a desktop computer, or a computer server.

Although the exemplary embodiment described herein employs the hard disk 160, it should be appreciated by those skilled in the art that other types of computer readable media which can store data that are accessible by a computer, such as magnetic cassettes, flash memory cards, digital versatile disks, cartridges, random access memories (RAMs) 150, read only memory (ROM) 140, a cable or wireless signal containing a bit stream and the like, may also be used in the exemplary operating environment. Non-transitory computer-readable storage media expressly exclude media such as energy, carrier signals, electromagnetic waves, and signals per se.

To enable user interaction with the computing device 100, an input device 190 represents any number of input mechanisms, such as a microphone for speech, a touch-sensitive screen for gesture or graphical input, keyboard, mouse, motion input, speech and so forth. An output device 170 can also be one or more of a number of output mechanisms known to those of skill in the art. In some instances, multimodal systems enable a user to provide multiple types of input to communicate with the computing device 100. The communications interface 180 generally governs and manages the user input and system output. There is no restriction on operating on any particular hardware arrangement and therefore the basic features here may easily be substituted for improved hardware or firmware arrangements as they are developed.

For clarity of explanation, the illustrative system embodiment is presented as including individual functional blocks including functional blocks labeled as a "processor" or processor 120. The functions these blocks represent may be provided through the use of either shared or dedicated hardware, including, but not limited to, hardware capable of executing software and hardware, such as a processor 120, that is purpose-built to operate as an equivalent to software executing on a general purpose processor. For example the functions of one or more processors presented in FIG. 1 may be provided by a single shared processor or multiple processors. (Use of the term "processor" should not be construed to refer exclusively to hardware capable of executing software.) Illustrative embodiments may include microprocessor and/or digital signal processor (DSP) hardware, read-only memory (ROM) 140 for storing software performing the operations discussed below, and random access memory (RAM) 150 for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. The system 100 shown in FIG. 1 can practice all or part of the recited methods, can be a part of the recited systems, and/or can operate according to instructions in the recited non-transitory computer-readable storage media. Such logical operations can be implemented as modules configured to control the processor 120 to perform particular functions according to the programming of the module. For example, FIG. 1 illustrates three modules Mod1 162, Mod2 164 and Mod3 166 which are modules configured to control the processor 120. These modules may be stored on the storage device 160 and loaded into RAM 150 or memory 130 at runtime or may be stored as would be known in the art in other computer-readable memory locations.

Figure 2:
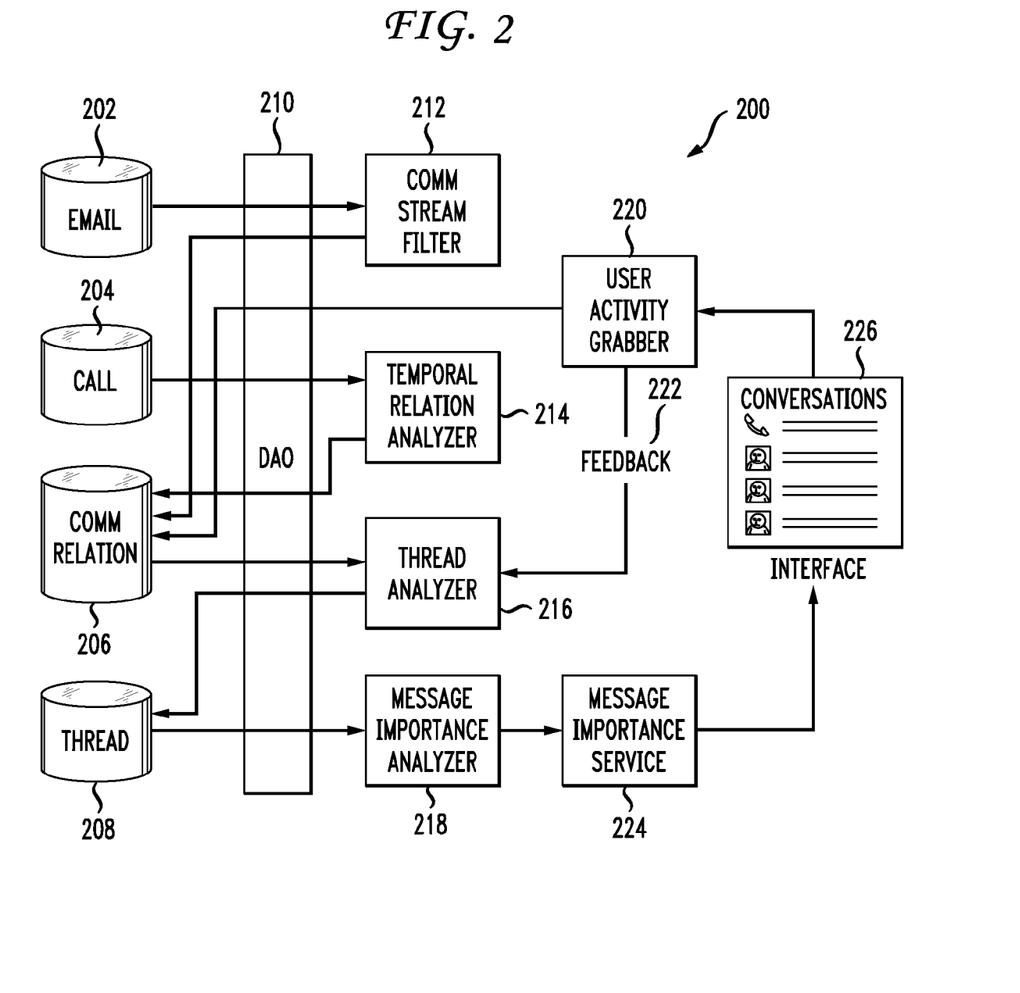
FIG. 2 illustrates an example architecture for forming and valuing threads.

Having disclosed some components of a computing system, the disclosure now describes in detail the forming of multi-modality threads and their subsequent usage. FIG. 2 illustrates an exemplary embodiment 200 of such a system. In this example, the source data upon which the threads are based comes from two sources: an email database 202 and a call database 202. Other exemplary forms of data which could be used include, but are not limited to, instant messages, texts, SMS, voice transcripts, event communications, images, video, and social media communications. Social media communications can include simple forms of communications, such as Twitter® feeds, or more complex communications such as multimedia Facebook® posts or comments.

A database Access Object (DAO) 210 can obtain data from database(s) without exposing the system 200 to the workings of the databases 202, 204, 206, 208. In this embodiment, email 202 is directed to a communication stream filter 212 which detects relationships based on replying and forwarding and records the relationships accordingly. The communication stream filter 212, or other intermediate entity, can send the results of this analysis to a communications relation database 206. Similarly, the system can provide access to call database 204 information to a temporal analyzer 214, which analyzes when calls were made in relation to one another. For example, one call may trigger another call and be classified as a Trigger. Other calls may immediately follow a previous call and classified as a Continuation. The system stores this information in the communications relation database 206. While this example shows only a few forms of data, this process of creating single modality threads can encompass data describing other communication modalities as well, so that identified relationships in the communications relations database 206 span multiple communication modalities.

In other embodiments, the temporal relation analyzer 214 can determine temporal relationships based on additional data associated with emails, texts, or other forms of communication. For instance, during a phone call the user may simultaneously communicate via other channels, such as instant messaging or email. These actions are multimodal and the system can classify them as a Contain. The system can define other multi-modal relationships, such as reply, forward, trigger, and continuation in a similar fashion.

The system records these relationships, such as Reply, Forward, Trigger, Continuation, and Contain, in the Communication Relations Database 206 along with records regarding user activity and other interactions from the user activity grabber 220. While the possibilities of how the user would interact with data are essentially endless, basic information such as when the user selects and item, ignores an item, the order of selection, and what the user was doing prior to, during, and after item selection are all important factors which can be recorded.

The system can direct information regarding communication relationships from the communications relations database 206 to the thread analyzer 216, along with immediate contextual feedback 222 from the user activity grabber 220. The thread analyzer 216 analyzes the relationships and assigns thread identifications to specific communication items. In doing so, the thread analyzer 216 can determine whether threads should be merged, divided, or otherwise organized. Thread identification can be assigned by adding a meta-data tag to the communication item, or simply by creating a list or an array of terms. The thread analyzer 216 can also, as part of its analysis, look for people working on similar or identical threads. The system can group people who satisfy a threshold level of proximity into teams. The system can group similar but distinct threads into projects when the threads meet a corresponding threshold similarity.

Once the communications are organized into multi-modality communication threads, the message importance analyzer 218 can analyze the importance of threads, individual communications, and persons. The analyzer 218 performs an extensive analysis, exemplary results of which are shown and disclosed below in association with FIG. 3. An exemplary embodiment of this process of thread analysis is shown and disclosed in association with FIG. 5. Upon analyzing the importance of threads, the message importance analyzer 218 can store the importance values in the message importance service 224. When the system 200 outputs thread information on the user interface 226, the display depends at least in part on the importance values stored in the message importance service 224. The user activity grabber 220 can monitor and/or record interactions with the user interface 226 and use that information to improve the system over time.

In one aspect, the system can incorporate a boundary that separates the user interface 226 from the user activity grabber 220, the communication stream filter 212, and the various analyzers 214, 216, 218, and the message importance service 224. Further, the system can logically separate, via the data access object 210, these components from the various databases 202, 204, 206, 208 and other communications information. This separated approach can improve portability, flexibility, performance, security, and other aspects of the overall system and architecture.

Figure 3:
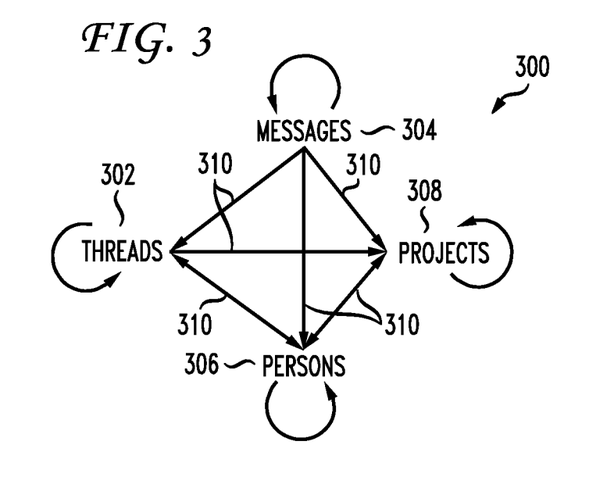
FIG. 3 illustrates an example of interconnectivity of thread components.

FIG. 3 illustrates one example visualization of expected thread analyzing results. The results shown 300 exemplify the relatedness of various items of importance, and show how all aspects of communications, such as the individual messages 304, the threads 302, the people involved 306, and projects 308 are intertwined and related, as shown by the arrows 310. In other embodiments of the results, the results form a probability matrix, or are recorded in a list format.

Figure 4:
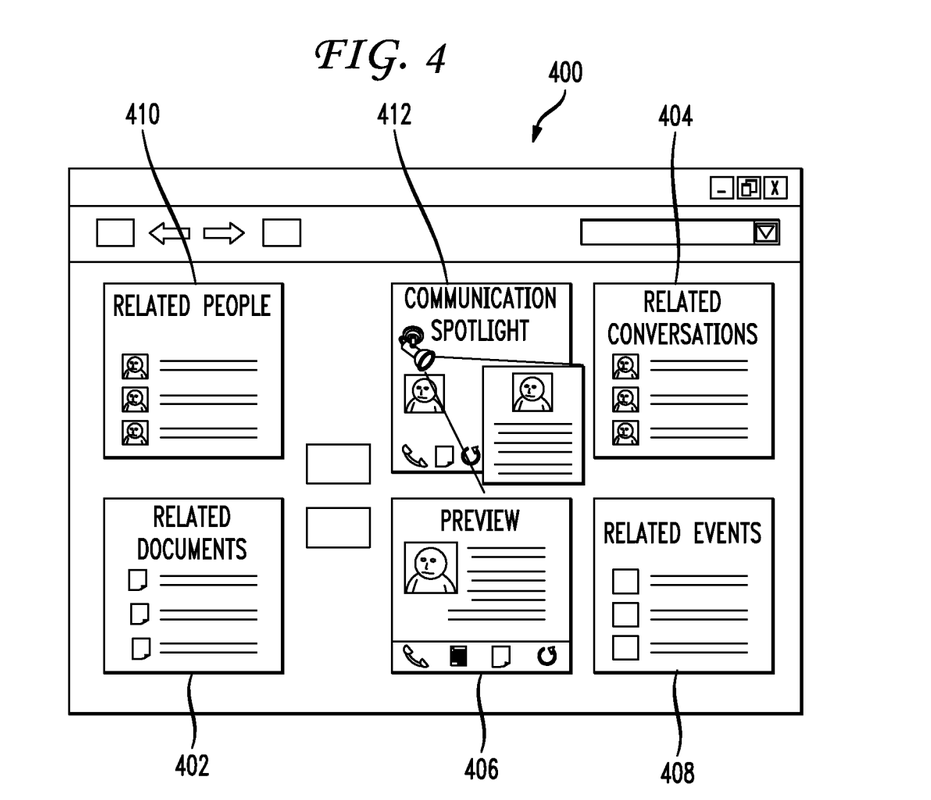
FIG. 4 illustrates an example graphical user interface for displaying highly valued threads.

FIG. 4 illustrates an exemplary user interface 400. This user interface displays the threads rated as most important to the user in the user's current context. These thread components can be documents 402, events 408, and conversations 404 that the system determines to be important to the user. Additionally, people determined to be important, either to the user, the threads, or both can be displayed 410 such that the user can initiate new communications or look up information associated with those users.

Figure 5:
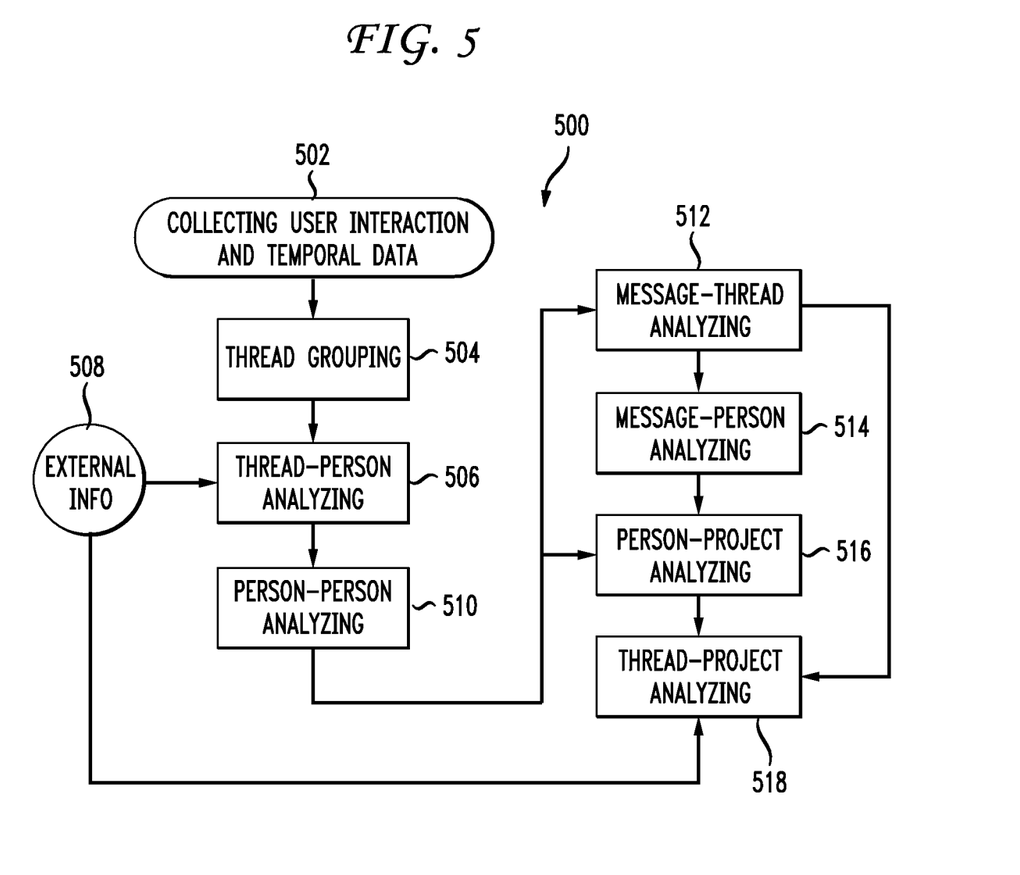
FIG. 5 illustrates an exemplary logical flow for performing thread analysis.

FIG. 5 illustrates one exemplary logical flow of the thread analyzer 216. In this exemplary flow, the initial stage is collecting user interactions and temporal data 502 associated with the communications. This initial stage corresponds to the data being sent to the thread analyzer 216 from the communications relations database 216 as shown and discussed with respect to FIG. 2. Here, the system groups the collected data 502 into threads 504 according to the previously defined relationships, at which point the system 100 begins determining the importance of the threads, shown as the message importance analyzer 216 of FIG. 2.

The first step is the analysis of the importance of a thread to a person 506, which is generally the user, but can be another person or group of people. The system computes individual's contributions and participation values to a thread based on the active content of the user, such as those portions of a communication exchange where a particular user contributed content, as opposed to passively receiving the information. In audio conversations, the system can rely on speech-to-text to identify active content, as well as subject matter. Active content can be obtained by a variety of equations, the simplest being the time or percentage of contribution made by the user over the length of the entire communication. Additionally, the system can apply external information 508 to the analysis to adjust the weighting. External information can include the positions of the user, the position of other people, and the frequency of access, for example. The system can normalize all or some of the contributions, but weighting factors can indicate that certain modalities are more important than others. For example, if a user wants to make phone calls more important than emails, or distinguish callers' and callees' contribution values, the user can do so by configuring importance values for the corresponding category. In most situations, the system can aggregate the active content of each message to determine the active content of a user throughout the thread. However, because of the ability to adjust weighting, how the system determines active content and how it uses that active content can vary.

The system 100 next performs a thread-person relevance calculation, still under the thread-person analysis 506. Here, the system first analyzes the thread-person temporal relationship, such as how quickly one responds, reads, forwards, or otherwise handles, dismisses, or ignores an email or other communication. The system categorizes and/or records these responses. Example categories for the responses include immediate response, quick response, same day response, next day response, in a week response, long delay response, and no response. Each response is defined by specific waiting times, and can include a specific relevance value, or weight. In addition, the system can check the 'Importance' headers of email messages or 'Priority' headers of call session setup messages, for example, to discover or acquire the priority of the data.

Having determined the importance of a thread to a user or to other individuals, the system 100 moves on to analyze person to person relationships 510, otherwise known as persistent person relationship calculations. Here the system operates according to similar principles as used in analyzing the importance of a thread to a person to analyze the importance of one person to another. Persistency means that the values used are collected over time, and do not necessarily reflect the current context of a user. For example, the calculation of person to person relevancy can be based on mutual communications of two people, the participations of two people in mutual threads, and sender-recipient communications. The mutual communications can be based on metadata such as speed of reply or acknowledgment when a user receives a communication. Immediately reading or replying to an event invitation can indicate higher importance. Participation of the two people in mutual threads can indicate that the two people share mutual interests and themes, even if no actual communication occurred. Sender-recipient communications are those communications directly between two people, where higher numbers generally indicate a higher level of relationship. All of these factors can be individually weighted, such that the number of communications can have higher importance, or the rate by which one responds to a communication. These weights can be adjusted to achieve a particular goal or configuration.

Based on the thread-person analysis 506 and the person-person analysis 510, the system analyzes the importance of each message or communication within a thread 512. The system can determine the importance of a single communication within a thread based on the response times, the number of persons involved in the communication, and how the singular communication relates to other communications. After this step the system can measure the importance of each message or communication to a person using similar methods 514. The system can display that information to a user via a graphical interface 226, including items calculated to be important to the user.

Having determined multiple importance values for threads, people, and individual communications, the thread analyzer forms projects based on person relevance 516. The system can form teams based on the people having the closest relationships from the person-person analysis 510. The system can then validate the threads the team members use to ensure that they are using common and/or related threads. The system can combine or otherwise associate teams that are based on identical or a subset of common threads.

The system analyzes threads according to this information, external information, and the importance of individual communications in order to form projects 518. For example, the system can group common threads for each team as a single project. Once initial projects are formed, the system 100 can perform a topic analysis to validate the set of threads are closely related. Should projects overlap, the system can determine how closely they relate, or the extent to which the projects overlap, and if the projects should merge.

The system can continue to perform the flow and analysis until each analysis is stable, which can include a single iteration or more. However, the system can perform the analysis within the thread analyzer 500 regularly at a periodic interval, based on an outside stimulus or input, and/or based on a minimum threshold of information for the analysis. In this way the system can continuously update communications, relationships, projects, and teams as additional communications, metadata, and other information become available. Also, this allows the system 100 to apply a decay function to the importance values, making older threads and older communications have less of an effect on the current contexts of the user.

Figure 6:
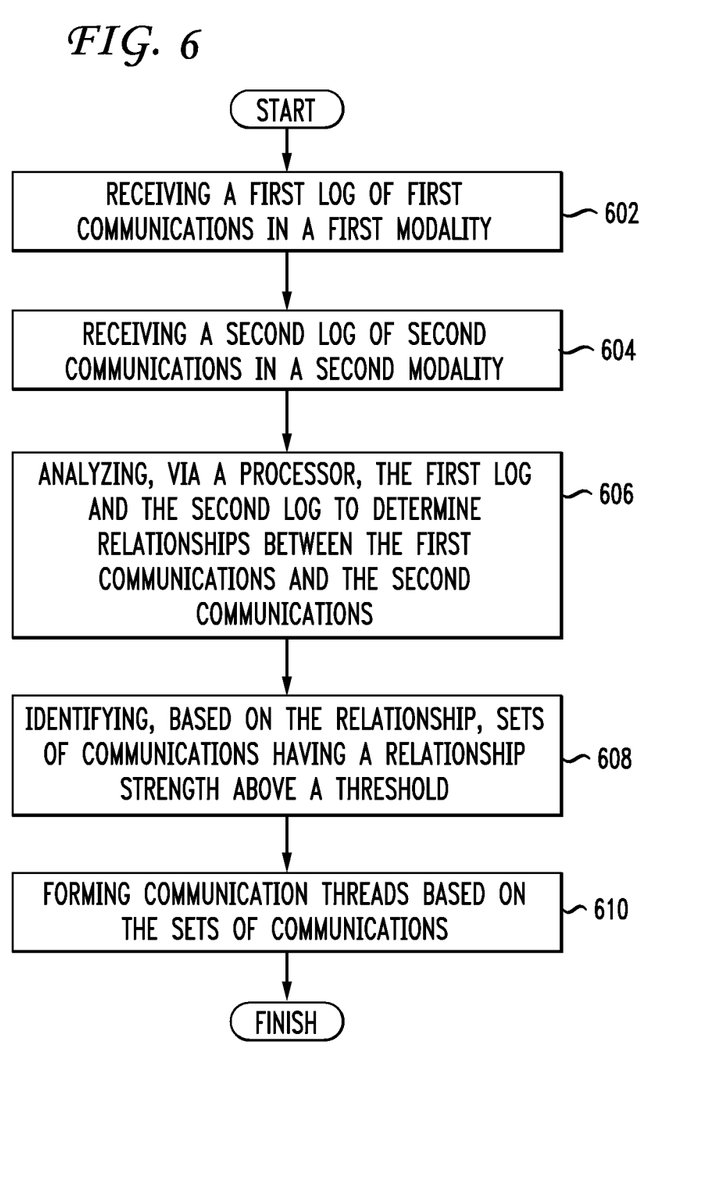
FIG. 6 illustrates an example method embodiment.

Having disclosed some basic system components and concepts, the disclosure now turns to the exemplary method embodiment shown in FIG. 6. For the sake of clarity, the method is discussed in terms of an exemplary system 100 as shown in FIG. 1 configured to practice the method. The steps outlined herein are exemplary and can be implemented in any combination thereof, including combinations that exclude, add, or modify certain steps.

A system 100 receives a first log of first communications in a first modality (602), and receives a second log of second communications in a second modality (604). These modalities can vary, but examples of communication modalities include, but are not limited to, short message service (SMS), text, and instant messenger; phone calls, video calls, emails, events, social networking, and voicemails. The system then analyzes the first log and the second log to determine relationships between the first communications and the second communications (606). As part of this, the system can determine importance values, based at least in part on past and/or present user actions. Moreover, the user, another person, and/or a completely or partially automated process can adjust the parameters and weights used to determine those relationships. The system then identifies, based on the relationships, sets of communications having a relationship strength above a threshold (608). Once these communications are identified, the system forms communication threads based on those sets (610). These communication threads can be formed by making a list of which communications are in a particular thread, or they may be marked by modifying or adding meta-data. In a user interface, the threads calculated to be most important to the user can be displayed. If there are sufficient threads of related topics, the system can group the threads into one or more projects. Similarly, if there are multiple people working on similar threads the system can assign those people to one or more teams.

Embodiments within the scope of the present disclosure may also include tangible and/or non-transitory computer-readable storage media for carrying or having computer-executable instructions or data structures stored thereon. Such non-transitory computer-readable storage media can be any available media that can be accessed by a general purpose or special purpose computer, including the functional design of any special purpose processor as discussed above. By way of example, and not limitation, such non-transitory computer-readable media can include RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the scope of the disclosure. For example, the principles herein can be applied at a client device level, at a unified communications level, and/or at virtually any other communications level. Those skilled in the art will readily recognize various modifications and changes that may be made to the principles described herein without following the example embodiments and applications illustrated and described herein, and without departing from the spirit and scope of the disclosure.

We claim:

1. A method comprising:
   receiving, at a first time, a first log of first communications in a first modality;
   receiving, at a second time, a second log of second communications in a second modality different from the first modality;
   analyzing, via a processor at a third time later than the first time and the second time, the first log and the second log to determine, based on temporal dispositions of the first communications and the second communications, a temporal communication relationship between the first communications and the second communications, the temporal communication relationship indicating one of a reply, a forward, a trigger, a continuation, or a containment;
   identifying, based on the temporal communication relationship, a set of communications from the first communications and the second communications, the set of communications being associated with a communication relationship strength above a threshold; and
   forming, via the processor at a fourth time later than the third time, a communication thread based on the set of communications.

2. The method of claim 1, wherein forming the communication thread is performed by adding a meta-data tag to a communication unit.

3. The method of claim 1, wherein the first modality and the second modality comprise two modalities of:
   short message service, text, instant messaging, phone calls, video calls, emails, events, social networking, and voicemail.

4. The method of claim 1, further comprising:
   forming a plurality of communication threads based on the set of communications; and
   ranking importance of the plurality of communications threads to a user based on a user action.

5. The method of claim 4, further comprising:
   displaying to the user a communication thread of the plurality of communication threads, the communication thread calculated to be most relevant to the user based on an importance value yielded from the ranking.

6. The method of claim 1, further comprising:
   forming a plurality of communication threads based on the set of communications;
   assigning, to a project, closely related communication threads from the plurality of communication threads;
   analyzing which people relate to the project; and assigning people into teams based on how closely they relate to the project.

7. The method of claim 1, wherein a user can modify parameters affecting the communication relationship strength.

8. A system comprising:
   a processor; and
   a computer-readable storage device storing instructions which, when executed by the processor, cause the processor to perform operations comprising:
      receiving, at a first time, a first log of first communications in a first modality;
      receiving, at a second time, a second log of second communications in a second modality different from the first modality;
      analyzing, at a third time later than the first time and the second time, the first log and the second log to determine, based on temporal dispositions of the first communications and the second communications, a temporal communication relationship between the first communications and the second communications, the temporal communication relationship indicating one of a reply, a forward, a trigger, a continuation, or a containment;
      identifying, based on the temporal communication relationship, a set of communications from the first communications and the second communications, the set of communications being associated with a communication relationship strength above a threshold; and
      forming, at a fourth time after the third time, a communication thread based on the set of communications.

9. The system of claim 8, wherein forming a communication thread comprises adding a meta-data tag to a communication unit.

10. The system of claim 8, wherein the computer-readable storage device stores additional instructions which, when executed by the processor, cause the processor to perform the operations further comprising:
    forming a plurality of communication threads based on the set of communications; and
    ranking relevance of the plurality of communications threads to a user based on a user action.

11. The system of claim 10, wherein the computer-readable storage device stores additional instructions which, when executed by the processor, cause the processor to perform the operations further comprising:
    displaying to the user one of a top n communication threads of the plurality of communication threads and a top n communication threads communication units, where n is a natural number, and the top n communication threads is based on a relevance value yielded from the ranking.

12. The system of claim 8, wherein the first modality and the second modality comprise two modalities of:
    short message service, text, instant messaging, phone calls, video calls, emails, events, social networking, and voicemail.

13. The system of claim 8, wherein the computer-readable storage device stores additional instructions which, when executed by the processor, cause the processor to perform the operations further comprising:
    forming a plurality of communication threads based on the set of communications;
    assigning, to a project, closely related communication threads from the plurality of communication threads;
    analyzing which people relate to the project; and
    assigning people into teams based on how closely they relate to the project.

14. The system of claim 13, wherein assigning the closely related communication threads further comprises:
    determining a topical distance between threads and merging threads having a close topical distance.

15. A computer-readable device storing instructions which, when executed by a processor, cause the processor to perform operations comprising:
    receiving, at a first time, a first log of first communications in a first modality;
    receiving, at a second time, a second log of second communications in a second modality different from the first modality;
    analyzing, at a third time later than the first time and the second time, the first log and the second log to determine, based on temporal dispositions of the first communications and the second communications, a temporal communication relationship between the first communications and the second communications, the temporal communication relationship indicating one of a reply, a forward, a trigger, a continuation, or a containment;
    identifying, based on the temporal communication relationship, a set of communications from the first communications and the second communications, the set of communications being associated with a communication relationship strength above a threshold; and
    forming, at a fourth time later than the third time, a communication thread based on the set of communications.

16. The computer-readable device of claim 15, storing additional instructions which, when executed by the processor, cause the processor to perform the operations further comprising:
    forming a plurality of communication threads based on the set of communications;
    assigning, to a project, closely related communication threads from the plurality of communication threads;
    analyzing which people relate to the project; and
    assigning people into teams based on how closely they relate to the project.

17. The computer-readable device of claim 16, storing yet additional instructions which, when executed by the processor, cause the processor to perform the operations further comprising:
    analyzing a similarity between more than one communication thread of the plurality of communication threads; and
    when the more than one communication thread is sufficiently similar, merging the more than one communication thread into a single communication thread.

18. The computer-readable device of claim 15, storing additional instructions which, when executed by the processor, cause the processor to perform the operations further comprising:
    forming a plurality of communication threads based on the set of communications;
    analyzing, based on a user action and current context, relevancy of each communication thread of the plurality of communication threads to a user; and
    displaying to the user one of communication threads or communication thread components having a sufficiently high relevancy value.

19. The computer-readable device of claim 15, wherein the first modality and second modality comprise two modalities of: short message service, text, instant messenger, phone calls, video calls, emails, events, social networking, and voicemail.

20. The computer-readable device of claim 19, storing additional instructions which, when executed by the processor, cause the processor to perform the operations further comprising utilizing a speech-to-text converter when a communication unit has a speech component.

\* \* \* \* \*